Dec. 11, 1945. H. Q. DAY 2,390,927
APPARATUS FOR CUTTING CURVED SURFACES
Filed Aug. 1, 1942 3 Sheets-Sheet 1
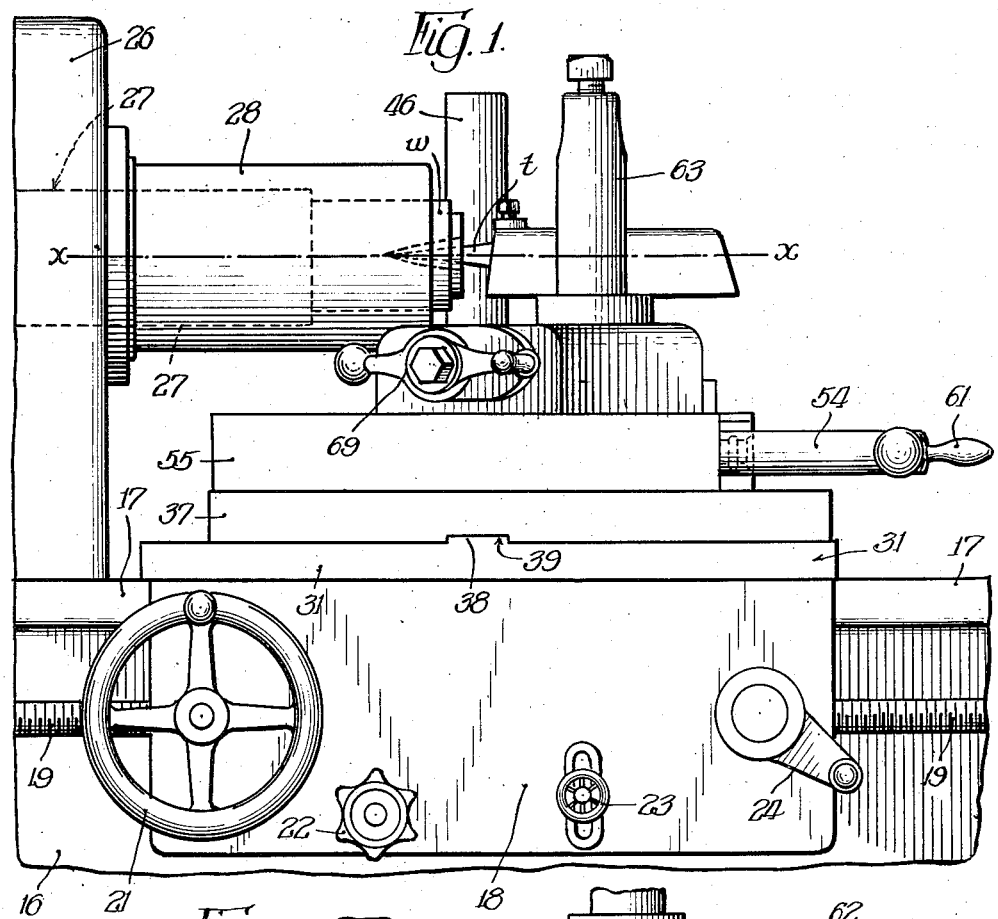
INVENTOR.
Howard Q. Day,
BY
Brown, Jackson, Buttolu & Dienner
ATTYS Dec. 11, 1945. H. Q. DAY 2,390,927
APPARATUS FOR CUTTING CURVED SURFACES
Filed Aug. 1, 1942 3 Sheets-Sheet 2
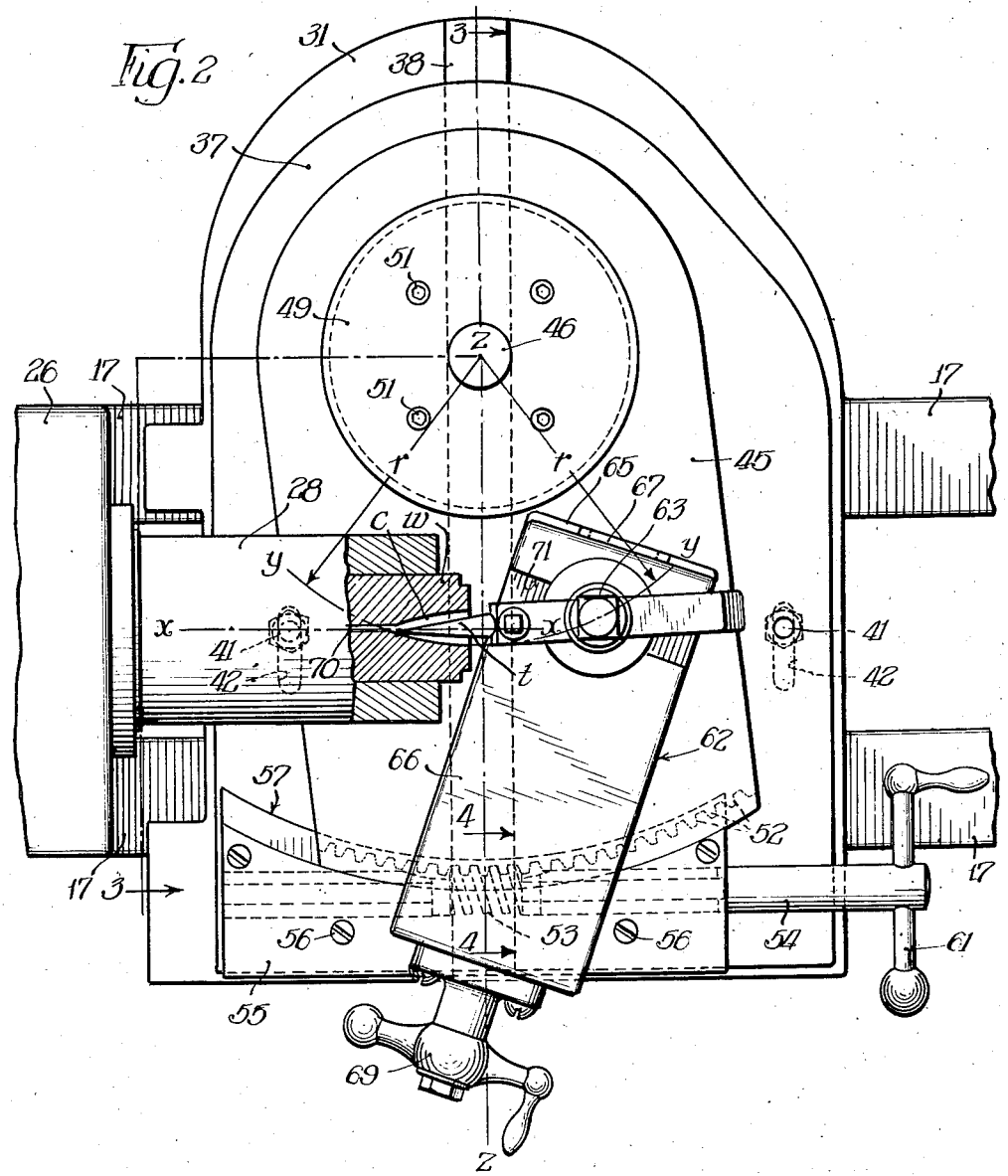
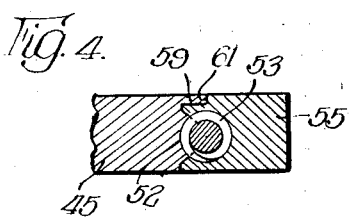
INVENTOR.
Howard Q. Day, Dec. 11, 1945. H. Q. DAY 2,390,927
APPARATUS FOR CUTTING CURVED SURFACES
Filed Aug. 1, 1942 3 Sheets-Sheet 3
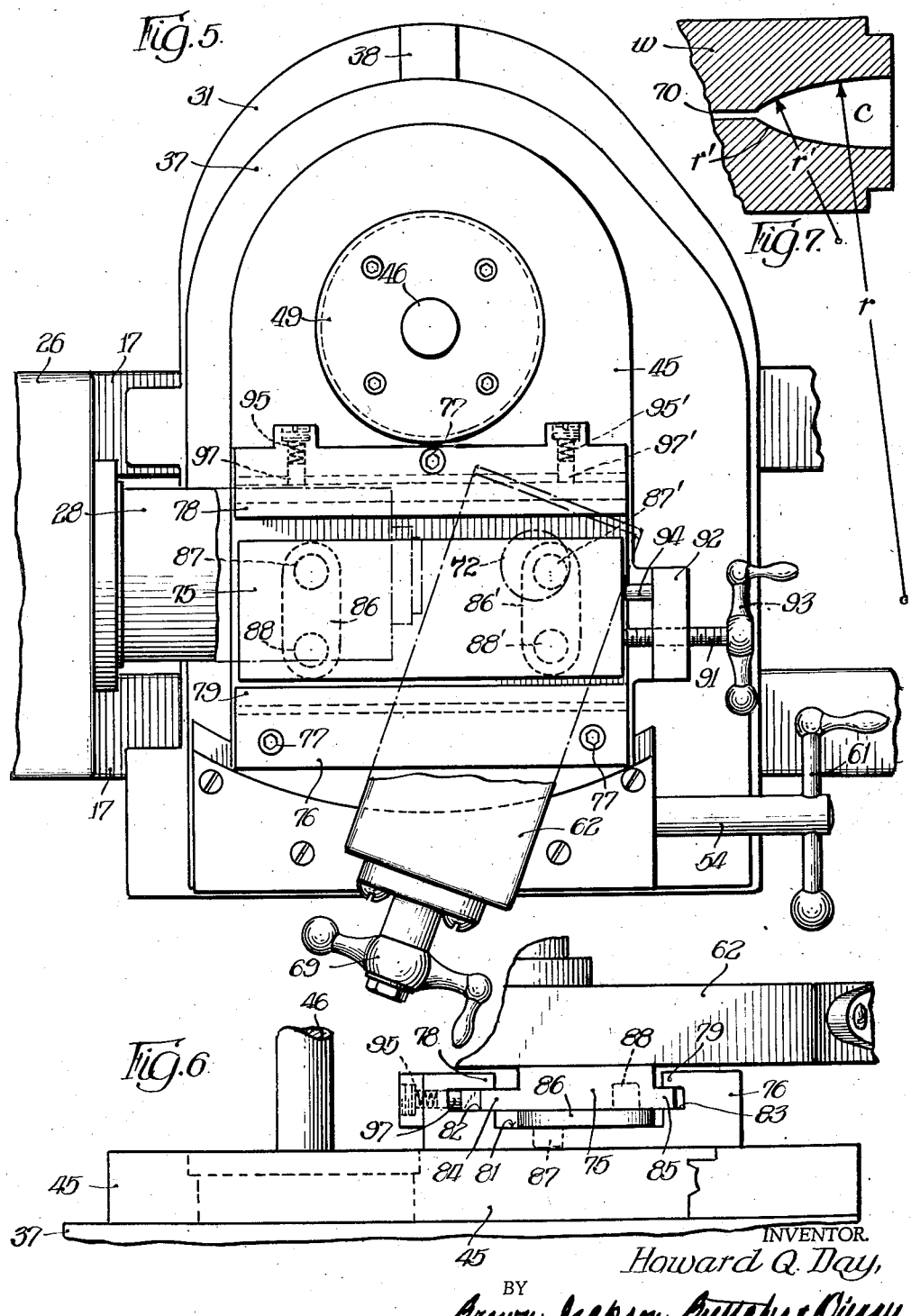
INVENTOR.
Howard Q. Day,
BY Patented Dec. 11, 1945

2,390,927

UNITED STATES PATENT OFFICE 2,390,927

APPARATUS FOR CUTTING CURVED SURFACES

Howard Q. Day, Chicago, Ill., assignor by direct and mesne assignments, of one-half to himself and one-half to Olive F. Day, both of Chicago, Ill.

Application August 1, 1942, Serial No. 453,256

5 Claims. (Cl. 77—3)

The present invention relates to apparatus for cutting curved surfaces.

One of the objects of the invention is to provide improved and simplified apparatus for cutting or machining compound-radii curves or double-curved surfaces of revolution.

Another object of the invention is to provide improved and simplified apparatus for cutting or machining compound-radii curves, conoidal surfaces and the like in die cavities and along other internal surfaces.

Another object of the invention is to provide improved apparatus of the above general description which is in the form of a lathe attachment capable of being employed on any conventional metal cutting lathe for performing the above operations.

My improved apparatus has been devised primarily to facilitate the operation of cutting or machining the die cavities in die blocks such as are used in ordnance work for producing the ogive curvature at the front ends of ordnance projectiles. However, the invention is not essentially limited to such form of apparatus. In the accompanying drawings illustrating two preferred embodiments of the invention for accomplishing this purpose:

Figure 1 is a fragmentary front elevational view of my improved apparatus mounted on a conventional lathe;

Figure 2 is a plan view of the same;

Figure 3 is a fragmentary transverse sectional view taken approximately on the plane of the line 3—3 of Figure 2;

Figure 4 is a detail sectional view taken on the plane of the line 4—4 of Figure 2;

Figure 5 is a plan view generally similar to Figure 2, showing a modified construction;

Figure 6 is a fragmentary transverse sectional view generally similar to Figure 3, showing this modified construction from the side; and Figure 7 is a sectional view on a larger scale of a typical die cavity such as can be made by the latter embodiment of the invention.

In the above drawings I have shown my improved apparatus as being mounted on a conventional metal cutting lathe comprising the usual bed 16 formed with the parallel ways 17 along which the tool supporting saddle ordinarily travels. In the preferred construction of my invention, I remove this saddle and substitute therefore a mounting plate which is secured to the apron 18 and which is adapted to travel along the ways 17 with the apron. However, my invention may also be mounted on this conventional saddle plate, if desired. The apron 18 is adapted to have longitudinal traverse along the feed screw 19 which extends substantially the length of the bed. A hand wheel 21 adjacent one end of the apron 18 provides for manual traverse of the apron along the feed screw 19. The apron is also provided with a conventional knob wheel 22 for controlling the apron clutch, the knob 23 for controlling the cross speed lever, and the lever 24 for controlling the split nut or apron nut cam. The driving head stock at the left hand end of the bed comprises the front bearing 26 mounting the usual spindle 27. In adapting the lathe to the use of my improved apparatus, a suitable clamping chuck 28 is secured to the end of the spindle for rotatably supporting the die block or other work piece w.

The several parts of my improved apparatus are assembled on a base plate 31 which extends across the top of the lathe bed and has its front edge rigidly secured in any suitable manner to the apron 18 so as to travel directly with the apron in the longitudinal traverse of the latter. As shown in Figure 3, the under surface of the base plate 31 is formed with front and rear parallel guide grooves 33 and 34 for sliding along the front and rear ways 17 of the lathe bed. If desired, a screw 35 may be threaded through a tapped boss 36 extending downwardly from the base plate 31, with the screw adapted to engage the side surface of one of the ways 17, either for the purpose of taking up any play between the plate and ways or for clamping the plate to the ways in any adjusted position.

Mounted on top of the base plate 31 is an adjusting plate 37 which is adapted for forward and rearward adjusting movement along a line disposed substantially at right angles to the lathe bed. This adjusting movement is guided by a raised guide rib 38 which projects upwardly from the surface of the base plate 31 and takes into a corresponding guide groove 39 recessed in the under surface of the adjustable plate. Said adjusting plate can be rigidly clamped in any adjusted position by the two clamping screws 41 (Figures 2 and 3) disposed one at each side edge of the base plate 31, between the bed ways 17, 17. Each clamping screw passes up through an elongated slot 42 extending parallel to the guide rib 38, and the upper end of each screw threads into a tapped hole 43 in the adjustable plate 37. The inward and outward adjustment of the plate 37 along the rib 38 enables the ogive curvature of the die cavity to be adjusted to any desired radius, as will be presently described, and once this adjustment has been established the plate 37 is locked to the base plate 31 by the clamping screws 41.

Pivotally mounted on top of the adjustable plate 37 for horizontal swinging movement is a swing plate 45 which is adapted to impart the swinging or arcuate movement to the tool holder, as will be later described. This swing plate is adapted to have horizontal swinging movement around the axis of a gauge post 46 which has its lower end anchored in the adjustable plate 37 and which has its upper end extending above the surface of the swing plate 45. If desired, the cylindrical surface of the gauge post 46 may constitute the actual bearing surface on which the swing plate has bearing engagement, in which case the swing post would also be a pivot post, but, in the preferred construction I desire to provide a larger surface of bearing engagement than would be afforded by the gauge post and accordingly I provide a large diameter cylindrical boss 47 projecting upwardly from the adjustable plate 37, concentric of the gauge post 46, this cylindrical boss thereby functioning as a gauge bearing or main mounting bearing for the swing plate 45. The inner end portion of the swing plate 45 is formed with a relatively large bearing opening 48 which has a snug bearing fit over the large bearing boss 47. The swing plate is held against upward displacement from the bearing boss 47 by a retainer disc 49 which is secured to the bearing boss by the screws 51 and which has its outer periphery seating in a counterbore 52 formed in the swing plate. Whenever the adjustable plate 37 is shifted inwardly or outwardly along the guide rib 38, the gauge post 46 affords a convenient gauge point for determining the radius from the pivotal center of the swing plate 45 to the rotating axis $x$—$x$ of the work piece $w$.

As best shown in Figure 2, the forward or outer edge of the swing plate 45 is formed with a worm gear sector 52 which meshes with a worm gear 53 mounted on an operating or feeding shaft 54. The shaft 54 is journaled in a housing plate 55 which is secured by screws 56 to the forward portion of the adjustable plate 37. The vertical rear edge of the housing structure 55 is formed with a concave curvature, as indicated at 57 (Figure 2) to match with the convex forward edge of the swing plate 45. In cross section (Figure 3) the housing structure formed with a convex rib 58 which fits into the profile of the sector teeth 52, and the swing plate 45 is formed with an upper lip or flange 59 which swings in an arcuate notch 61 formed in the upper surface of the housing plate 55. This structural arrangement of the swing plate and of the housing plate provide an efficient housing or shield for preventing chips and scrap metal from getting into the sector teeth 52 or worm 53. The right hand end of the worm shaft 54 carries an operating handle 61 by which the worm 53 can be rotated for causing the swing plate 45 to swing to left or right around the axis of the gauge post 46.

Mounted on top of the swing plate 45 is a compound tool rest designated 62 in its entirety. A tool post 63 rises from the rear portion of this compound rest, and carries the cutting tool $t$. The compound rest 62 is of any typical or conventional construction comprising a base 65 and a head or top plate 66. A dovetail guide rib 67 projects upwardly from the base 65, and the head member 66 is provided with a dovetail recess having sliding engagement over the rib 67. An operating handle 69 at the front end of the compound rest actuates a suitable feed screw within the rest for causing the cap or head member 66 to travel back and forth along the dovetail guide 67. The rear portion of the head member 66 is formed with a transverse slot 71 of T-shaped cross section, and the tool post 63 has an enlarged lower head which is adapted to clamp in different shifted positions and in different rotated positions in this slot 71. The entire compound rest 62 can also be swung horizontally about a swivel collar 72 which anchors the base member 65 to the swing plate 45 (Figure 3). This swivel collar 72 is secured to the swing plate 45 by a cap screw 73 which screws down into any one of a plurality of tapped holes 74 formed in the swing plate. These holes 74 are located at spaced points across the top surface of the swing plate so that the compound rest may be given its swiveled mounting at any desired point on the swing plate. Set screws are preferably arranged to pass diagonally in from the sides of the compound rest to engage the grooved periphery of the swivel collar 72.

Referring now to the operation of this embodiment illustrated in Figures 1, 2 and 3, the cylindrical die block $w$ first has the bullet-shaped cavity $c$ roughed out in the end of the die block, as by mounting the block in a turret head lathe where successive drills of different diameters are drilled to different depths in the block. A tapered roughing drill may also be used at this stage of the operation to give a more finished curved surface to the cavity, thereby smoothing out the stepped formation resulting from the successive drills of different diameters. The use of this tapered roughing tool, however, does not produce the desired precision of curvature and surface necessary in these die block cavities. The die block is then transferred to the lathe provided with my improved machining apparatus, or this improved machining apparatus is substituted for the turret head on the original lathe, and the die block is rigidly anchored in the chuck 28 by suitable set screws or the like. The apparatus is then brought up to the work by actuation of the hand wheel 21 for causing the apparatus to be moved by longitudinal traverse up to approximately the position illustrated in Figure 2. In this position, the end face of the work piece $w$ is preferably just to the left of the transverse plane $z$—$z$ of the pivot axis 46. At this time, the swing plate 45 occupies a position in which it has been swung considerably to the right, where the point of the cutting tool $t$ lies approximately at, or does not extend much beyond, the plane $z$—$z$. Having set the cutting tool at the proper angle and radius for cutting the desired caliber and curvature of cavity $c$, the worm feed handle 61 is now slowly rotated. This slowly swings the swing plate 45 to the left with an angular feeding motion around the axis of the gauge post 46, thereby causing the point of the cutting tool $t$ to swing through the arc $y$—$y$. The arcuate motion of the cutting tool machines out the cavity with a precision curve corresponding to the arc $y$—$y$. This curve $y$—$y$ intersects the axis $x$—$x$ of the cavity, with the result that the cavity assumes the form of a compound radii curve or a double-curved surface of revolution formed around the axis $x$—$x$. That is to say, in the exemplary arrangement herein shown, the cavity corresponds to the formation of a bullet or other ordnance projectile, or corresponds to any desired one of a series of cavities employed in any one of a series of successive die steps in the shaping of such a bullet or projectile. That is to say, there may be several of these die blocks $w$ employed in sequence in the operation of shaping steel tubing to form the exterior jacket of the projectile, and each one of these die blocks may have a cavity of different curvature for shaping the tubing by successive die operations. My improved apparatus is readily adaptable to the machining of the die cavities of any one of these die blocks, this adaptability being obtained by virtue of the several adjustments previously described and by virtue of the cooperative relationship of the parts. The finished curve $y—y$ in the cavity of the final die block used in the last of the sequence of shaping operations on the steel tubing, produces a curve which is commonly called the ogive curve of the pointed end of the projectile. A small vent opening 70 may lead from the tip of the cavity $c$ to the other end of the die block. The radius $r$ of the ogive curve may bear a fixed relationship to the caliber of the projectile for one class of ordnance, and may bear a different relationship to the caliber of the projectile for another class of ordnance. In most instances, the radius $r$ of this ogive curve $y—y$ is usually from seven to nine times the caliber of the projectile. It will be understood that this ratio of radius to caliber can be readily adjusted in my improved apparatus, as, for example, by shifting the adjustable plate 37 inwardly or outwardly along the guide rib 38 of the base plate 31. The different radii for different calibers of projectiles may also be obtained in this manner. The inward and outward shifting of the head member 66 of the compound rest 62 also enables the tool $t$ to be shifted for these adjustments.

Referring now to the modified construction illustrated in Figures 5 and 6, this modified construction includes a second swing plate 75 which enables a different swinging motion to be imparted to the cutting tool $t$, separate from the swinging motion imparted by the first swing plate 45. This second swing plate 75 is preferably arranged to have a parallel-link swinging motion whereby each successive position of the cutting tool $t$ in the feeding motion of said second swing plate is also parallel to all preceding positions. This enables the cutting tool to be extended back into deeper cavities without having the side portions of the tool strike the outer end of the cavity, or without other interference arising between the tool and the outer end of the cavity. In the preferred form of this later embodiment of my invention, this parallel link or multiple pivot form of swing plate 75 is preferably employed in conjunction with the single pivot form of swing plate 45 so that different combinations of the two motions may be obtained. For example, the multiple pivot swing plate 75 preferably swings on a radius which is substantially smaller than the radius $r$ of the single pivot swing plate 45, whereby the die cavity $c$ may be machined out to have a composite curvature wherein one portion of the length of the cavity is curved on one radius $r$ and another portion of the length of the cavity is curved on another radius $r'$. In this latter construction, the base plate 31, adjustable plate 37 and first swing plate 45 are arranged in the same identical relation described above in connection with Figures 1–4. However, instead of mounting the compound tool rest 62 directly on the first or single pivot swing plate 45, I interpose a second swing plate mechanism between the plate 45 and the tool rest 62.

This second swing plate mechanism comprises a guide base 76 which is rigidly secured by screws or bolts 77 to the first swing plate 45. Formed along the front and rear edges of the base member 76 are the two raised portions 78 and 79 defining a trough-like area 81 therebetween. Formed in the opposing faces of the raised margins 78 and 79 are guide grooves 82 and 83. The swing plate 75 is disposed between the raised marginal portions 78 and 79, and is provided with guide flanges 84 and 85 which are guided for sliding and swinging movement within the guide grooves 82 and 83 respectively. The motion of the swing plate 75 is defined by two parallel links 86, 86' which pivotally connect the swing plate with the base member 76. The rear end of each link 86, 86' is formed with a pivot stud 87, 87' which extends down into a pivot socket or cavity formed in the bottom portion of the base member 76 (Figure 6). The forward or front end of each pivot link is formed with an upwardly projecting pivot lug 88, 88' which extends upwardly into a pivot cavity formed in the under side of the swing plate 75. Thus, it will be seen that any to and fro motion of the swing plate 75 is a parallel link swinging motion around the two pivot centers 87, 87'. A feed screw 91 is provided for producing a forced swinging motion of this swing plate in a direction toward the work piece $w$. This feed screw threads through a tapped bore in an end block 92 which extends upwardly from the right hand end of the base member 76. A handle 93 on the outer end of the screw 91 serves to rotate the screw. A stop pin 94 projecting from the end bracket 92 serves to limit motion of the swing plate toward the right, whereby swing plate 75 cannot have a return motion beyond the dead center position illustrated in Figure 5. If desired, spring means may be provided for causing a return motion of the swing plate 75, and for holding the swing plate against the end of the feed screw 91. One preferred form of such spring means comprises the compression springs 95, 95' disposed in plugged bores in the raised marginal portion 78 and acting through plungers 97, 97' which have sliding abutment against the guide flange 84 of the swing plate 75.

The compound tool rest 62 is mounted on the swing plate 75 in substantially the same manner that this tool rest is mounted on the swing plate 45 of the previously described embodiment. That is to say, a swivel collar 72 is secured to the swing plate 75 by a screw 73, and the swing plate is provided with a plurality of tapped holes for receiving this screw, whereby the swivel collar may be variously positioned on the swing plate 75. The compound rest 62 affords the same adjustments for the cutting tool $t$ that it did in the case of the previously described embodiment.

It will be understood that this last described embodiment can be operated in identically the same manner as the first described embodiment. That is to say, the second swing plate 75 may, if desired, remain inactive so that all arcuate motion is given to the cutting tool through the swinging motion of the first swing plate 45. However, the addition of the second swing plate 75 greatly increases the adaptability of the apparatus to different operating conditions and different requirements. For example, for machining deeper cavities without causing interference between the cutting tool and the forward edge of the cavity, or for machining cavities wherein the curve y—y is a composite curve having two radii, the second swing plate 75 greatly supplements the field of utility of the apparatus. The two swing plates 45 and 75 may be operated in any desired sequence, or simultaneously if desired. While I have illustrated the pivot links 86, 86' as being of relatively short length so that they impart a short radius swing to the swing plate 75, nevertheless it will be understood that these links may be made of any desired length, and may have an effective radius as great as or greater than the radius r afforded by the first swing plate 45.

While I have illustrated and described what I regard to be the preferred embodiments of my invention, nevertheless it will be understood that such are merely exemplary and that numerous modifications and rearrangements may be made therein without departing from the essence of the invention. For example, while I much prefer to employ my improved apparatus on a metal cutting lathe so as to utilize the feed screw 19 for effecting longitudinal traverse of the apparatus along the lathe bed, nevertheless it will be understood that I may also mount my apparatus on a wood turning lathe, and merely shift the apparatus along the bed by hand. Furthermore, if it is desired to employ only the parallel-link type of swing plate 75, the guide base 76 may be constructed with guide grooves similar to the guide grooves 33 and 34 of the base plate 31 for mounting directly on the ways 17 of the lathe bed. The apparatus can be employed for cutting or machining other surfaces than the bullet shaped cavities of die blocks.

I claim:

1. Apparatus of the class described comprising means for rotating the work, a base member, a swing plate pivotally mounted on said base member for swinging movement, feeding means for causing swinging movement of said swing plate, a second swing plate, a pair of parallel links pivotally connecting said second swing plate with said first swing plate, second feeding means for causing said second swing plate to swing relatively to said first swing plate, and a tool carried by said second swing plate adapted to engage the work.

2. Apparatus for cutting curved surfaces comprising a revolving work holder for revolving the work, a tool holder for holding a tool against the work, means cooperating with said tool holder for causing said tool to move through a first predetermined path defined by a single pivot center in machining part of the curved surface, and means for causing said tool to move through a second predetermined path defined by an arrangement of parallel link centers in machining another part of said curved surface.

3. In apparatus for machining curved die cavities in die blocks, the combination with a lathe comprising a lathe bed, a rotating work holder adjacent one end of said bed adapted to carry the die block, and an apron adapted to have longitudinal traverse along said bed, of a base plate mounted on said apron so as to travel directly therewith in the longitudinal movement of said apron along said bed toward and away from the die block held in the rotating work holder, front and rear parallel guide grooves formed in the under side of said base plate for sliding along the front and rear ways of the lathe bed, clamping screw means carried by said base plate and adapted to engage one of said ways for clamping said base plate in different longitudinally adjusted positions along said lathe bed, an adjusting plate mounted on top of said base plate, a raised guide rib projecting upwardly from said base plate and engaging in a cooperating guideway in said adjusting plate, said guide rib and guideway extending substantially at right angles to said lathe bed to permit said adjusting plate to be shifted to different transversely adjusted positions crosswise of said lathe bed, clamping means for clamping said adjusting plate in different transversely adjusted positions on said base plate, a gauge post rising from the rear portion of said adjusting plate, said gauge post being spaced rearwardly from the vertical axial plane of said rotating work holder, a cylindrical bearing boss projecting upwardly from said adjusting plate concentrically of said gauge post, a swing plate having a bearing opening engaging over said bearing boss whereby said swing plate has horizontal swinging movement across the top of said adjusting plate around the axis of said gauge post, an arcuate worm sector carried by the forward edge of said swing plate, an adjusting worm meshing with said worm sector for adjusting the angular position of said swing plate, bearing means for said adjusting worm carried by said adjusting plate, a handle for actuating said adjusting worm, a swivel collar, screw means for securing said swivel collar to said swing plate at any one of a plurality of spaced points across the top surface of said swing plate, a compound tool rest comprising a base portion mounted on said swivel collar for swinging movement thereon, whereby said compound tool rest is capable of swiveling rotation on said swing plate about a vertical axis separate from the vertical axis of said gauge post, said compound tool rest comprising an adjustable head, cooperating guideways formed on said base portion and on said adjustable head permitting sliding movement of said adjustable head relatively to said base portion, screw means for effecting such sliding movement, said adjustable head having a transverse T-slot formed therein, a tool post adapted to clamp in different shifted positions and in different rotated positions in said T-slot, and a cutting tool carried by said tool post adapted to engage the die blocks at a point forward of the vertical axial plane of said rotating work holder.

4. The combination with a lathe comprising a lathe bed, a rotating work holder adjacent one end of said bed, and an apron adapted to have longitudinal traverse along said bed, of a base plate mounted on said apron so as to travel directly therewith in the longitudinal movement of said apron along said bed toward and away from the work held in the rotating work holder, front and rear parallel guide grooves carried by said base plate for sliding along the front and rear ways of the lathe bed, clamping means for clamping said base plate in different longitudinally adjusted positions along said lathe bed, an adjusting plate mounted on top of said base plate, cooperating guide rib surfaces and guideway surfaces carried by said base plate and said adjusting plate providing for transverse adjustment of said adjusting plate substantially at right angles to the lathe bed, clamping means for clamping said adjusting plate in different transversely adjusted positions crosswise of the lathe bed, a swing plate mounted for horizontal swinging movement across the top of said adjusting plate, pivot means defining a vertical pivot axis around which said swing plate has pivotal movement relatively to said adjusting plate, said vertical pivot axis being spaced rearwardly from the vertical axial plane of said rotating work holder, a worm sector carried by said swing plate, an adjusting worm carried by said adjusting plate and meshing with said worm sector for adjusting the angular position of said swing plate relatively to said adjusting plate, a compound tool rest carried by said swing plate and adapted to hold a tool for engaging the work carried by said rotary work holder, and swivel means connecting said compound tool rest with said swing plate whereby said tool rest is capable of swiveling movement about an axis separate from the pivotal axis of said swing plate.

5. In apparatus for machining a curved cavity in a work piece, the combination with a lathe comprising a lathe bed, a rotating work holder adjacent one end of said bed, and an apron adapted to have longitudinal traverse along said bed, of a base plate connected with said apron so as to travel directly therewith in the movement of said apron along said bed toward and away from the work held in the rotating work holder, an adjusting plate mounted on top of said base plate, cooperating guideways carried by said base plate and said adjusting plate guiding said adjusting plate for transverse adjusting movement substantially at right angles to said lathe bed, a swing plate mounted on said adjusting plate for horizontal swinging movement across the top of said adjusting plate, pivot means defining a substantially vertical pivot axis between said adjusting plate and said swing plate around which said swing plate is adapted to pivot, a worm sector carried by said swing plate, a worm carried by said adjusting plate and meshing with said worm sector for adjusting said swing plate to different angular positions relatively to said adjusting plate, and a tool rest mounted on said swing plate adapted to carry a tool for engaging the work held by said rotating work holder, the substantially vertical pivot axis around which said swing plate is adapted to swing being spaced a substantial distance rearwardly from the vertical axial plane of said rotating work holder, and said tool being positioned to engage the work at a point forward of the vertical axial plane of said rotating work holder, whereby said tool is operative to machine a curved cavity in the work piece.

HOWARD Q. DAY.